C. C. BLAKE.
INSOLE ROUNDING MACHINE.
APPLICATION FILED AUG. 8, 1916.

1,340,520.

Patented May 18, 1920.
6 SHEETS—SHEET 1.

Fig 1

Inventor
Charles C. Blake
by Charles W. McDermott
his attorney

C. C. BLAKE.
INSOLE ROUNDING MACHINE.
APPLICATION FILED AUG. 8, 1916.

1,340,520.

Patented May 18, 1920.
6 SHEETS—SHEET 2.

Inventor
Charles C. Blake
by Charles W. McDermott
his attorney

Fig 5

C. C. BLAKE.
INSOLE ROUNDING MACHINE.
APPLICATION FILED AUG. 8, 1916.

1,340,520.

Patented May 18, 1920.
6 SHEETS—SHEET 4.

Inventor
Charles C. Blake
by Charles W. McDermott
his attorney

C. C. BLAKE.
INSOLE ROUNDING MACHINE.
APPLICATION FILED AUG. 8, 1916.

1,340,520.

Patented May 18, 1920.
6 SHEETS—SHEET 5.

Inventor
Charles C. Blake
by Charles W. McDermott
his attorney

C. C. BLAKE.
INSOLE ROUNDING MACHINE.
APPLICATION FILED AUG. 8, 1916.

1,340,520.  Patented May 18, 1920.
6 SHEETS—SHEET 6.

Inventor
Charles C. Blake
by Charles W. McDermott
his attorney

UNITED STATES PATENT OFFICE.

CHARLES C. BLAKE, OF BROOKLINE, MASSACHUSETTS.

INSOLE-ROUNDING MACHINE.

1,340,520.   Specification of Letters Patent.   Patented May 18, 1920.

Application filed August 8, 1916. Serial No. 113,723.

*To all whom it may concern:*

Be it known that I, CHARLES C. BLAKE, a citizen of the United States, residing at Brookline, in the county of Norfolk and State of Massachusetts, have invented a new and useful Improvement in Insole-Rounding Machines, of which the following is a specification.

The present invention relates to machines for use in the manufacture of lasts and shoes, and more particularly to sole rounding machines.

The principal object of the present invention is to provide a novel construction and arrangement of devices for operating upon and for supporting the work whereby the rounding operation is performed in an accurate and reliable manner.

To the accomplishment of this object, and such others as will hereinafter appear, the features of the invention relate to certain devices, combinations and arrangements of parts hereinafter described and then set forth broadly and in detail in the appended claims which possess advantages readily apparent to those skilled in the art.

The various features of the present invention will be best understood from an inspection of the accompanying drawings illustrating an embodiment of the invention as constructed for rounding an insole secured to a last bottom, in which.

Figure 1:
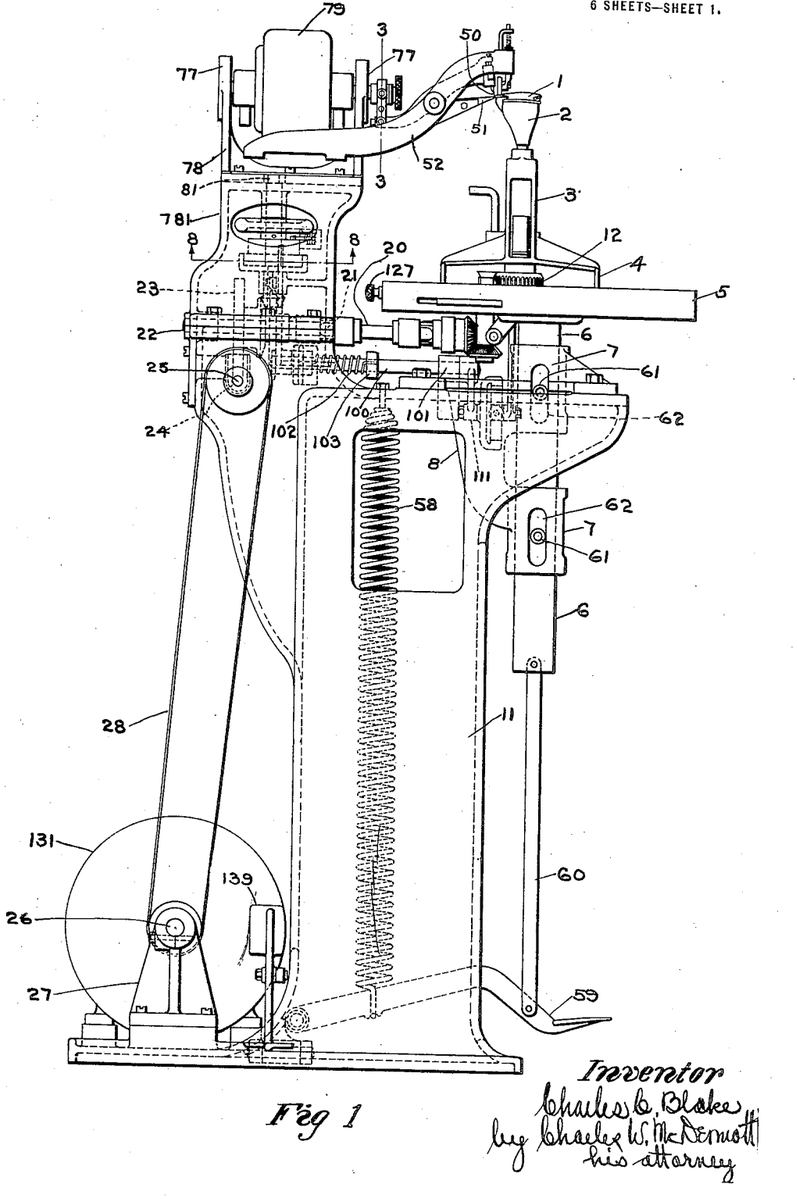
Figure 1 is a front elevation of the insole rounding machine.

In the illustrated embodiment of the invention a roughly died-out insole 1 (Fig. 1) is secured to a last 2 which is jacked upon a work support 3 of the saddle and spindle type. The work support 3 is provided with runners 4 which slide on a platen or table 5 secured upon the upper end of a post 6 which is mounted for vertical movement in bearings 7 formed in a bracket 8 secured to a column 11.

Figure 11:
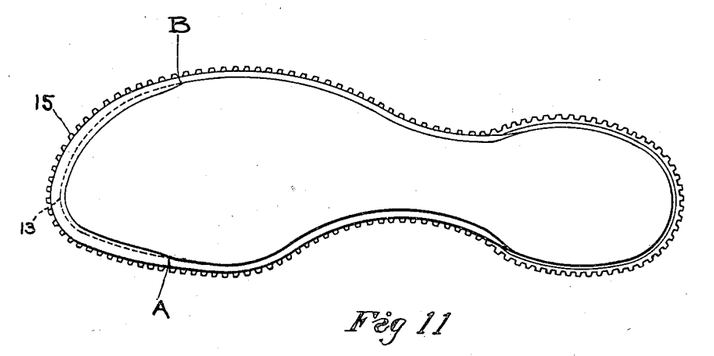
Fig. 11 is a diagrammatic plan illustrating the relation between the edge of the rounded insole and the guiding flange.
Figure 12:
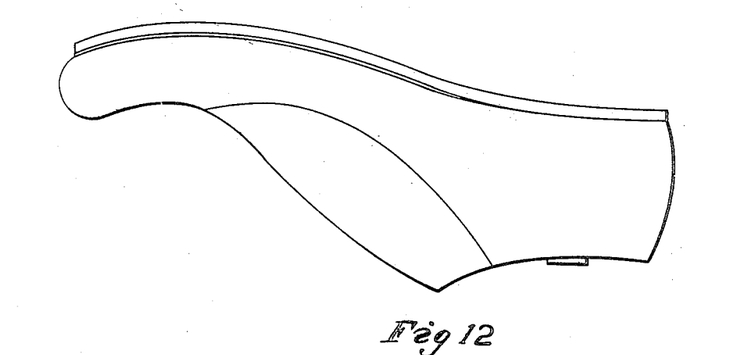
Fig. 12 is an elevation of the last having a rounded insole attached thereto.

In order to feed the work support 3 over the table 5 and thus transfer the point of operation of the operating means around the insole the work support 3 is mounted on a leader 12 (Figs. 1 and 14) provided with a guiding flange 13. As shown in Fig. 11 the projections of the edge of the bottom of the last at the sides thereof upon the plane of the leader coincide with the inside face of the guiding flange. At the toe the projections of the edge of the last bottom upon the plane of the leader fall within the guiding flange. This variation at the toe of the leader is for the accommodation of the toe-box which in a subsequent operation will be applied to the toe-end of the insole. When the upper having the toe-box within it is lasted to the edge face of the insole in accordance with the method of lasting practised by me the projections of the free edge of the upper upon the plane of the leader will coincide with the inside face of the guiding flange throughout its length. Stated in another way, the projections upon the plane of the leader of the outside edge of the toe-box secured in position on the toe of the insole will coincide with the guiding flange at the toe of the leader.

Figure 7:
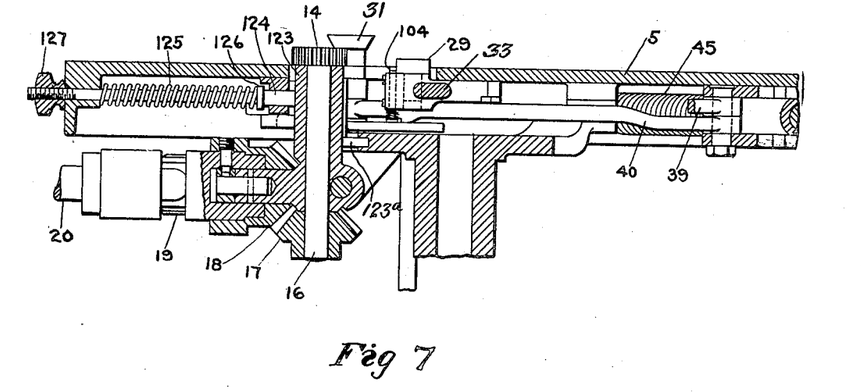
Fig. 7 is a front sectional elevation on the line 7—7, Fig. 5.
Figures 8, 9:
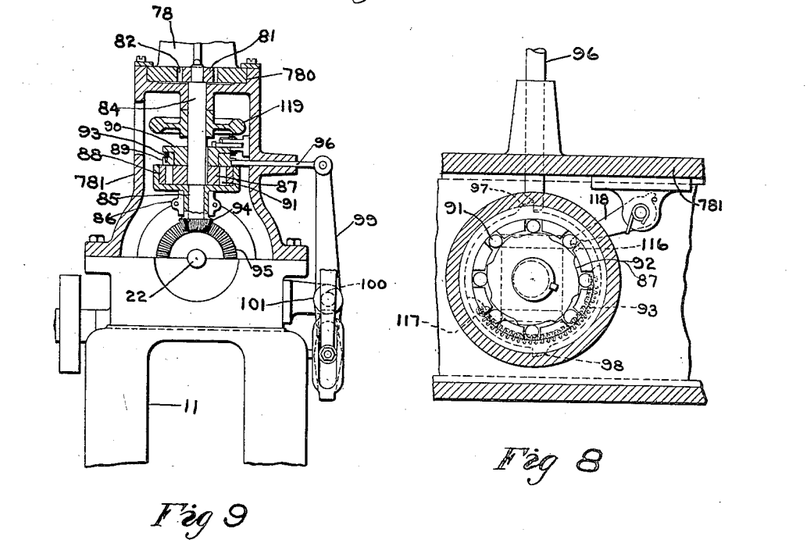
Fig. 8 is a sectional bottom plan on the line 8—8, Fig. 1.
Fig. 9 is a right side sectional elevation on a plane cutting the clutch for the shifting mechanism.
Figure 13:
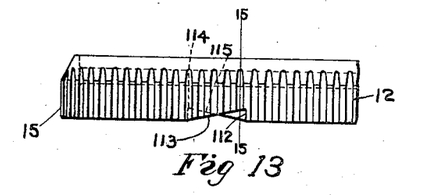
Fig. 13 is a detail in elevation of the leader.

The leader is actuated to transfer the point of operation of the tool around the insole by a pinion 14 (Fig. 7) which engages rack teeth 15 (Figs. 11 and 13) formed on the exterior face of the guiding flange 13. The pinion 14 is secured to the upper end of a short shaft 16 which carries at its lower end a bevel gear 17 engaged with a similar gear 18. The bevel gear 18 is connected by a universal joint 19 to a short shaft 20 (Fig. 1) which is connected by a universal joint 21 to a shaft 22 (Fig. 9) journaled in the column 11. The shaft 22 carries a worm wheel 23 which meshes with a worm 24 on a shaft 25 also journaled in the column 11. The shaft 25 (Fig. 1) is driven from a short shaft 26, journaled in a bracket 27 on the base of the machine, by a belt 28 which passes over pulleys on the shafts 25 and 26, respectively.

In order to correct the relative position of the operating means and the insole during the transfer of the point of operation of the operating means around the insole to maintain the edge of the insole in proximity to the operating means in the line of feed the guiding flange 13 on the leader is engaged by a cylindrical pin 29 (Fig. 5) arranged to engage inside the flange and by guide rolls 30 and 31 arranged to engage outside the flange. These guiding devices are mounted on supports secured to the bottom of the table 5 and are positioned above the table 5 through an opening 32 formed therein. The support for the pin 29 is a lever 33 one end of which pivots at 34 and the other end of which slides in ways 35 secured to the bottom of the table 5. The lever 33 is swung to engage the guide pin 29 with the guiding flange 13 by a toggle 36 the links of which are pivoted to the bottom of the table 5 and to the lever 33, respectively. When the toggle is made the pin 29 is locked in engagement with the inside face of the guiding flange. The toggle 36 is made or broken by a handle 37 forming an extension of one of the links of the toggle.

Figure 5:
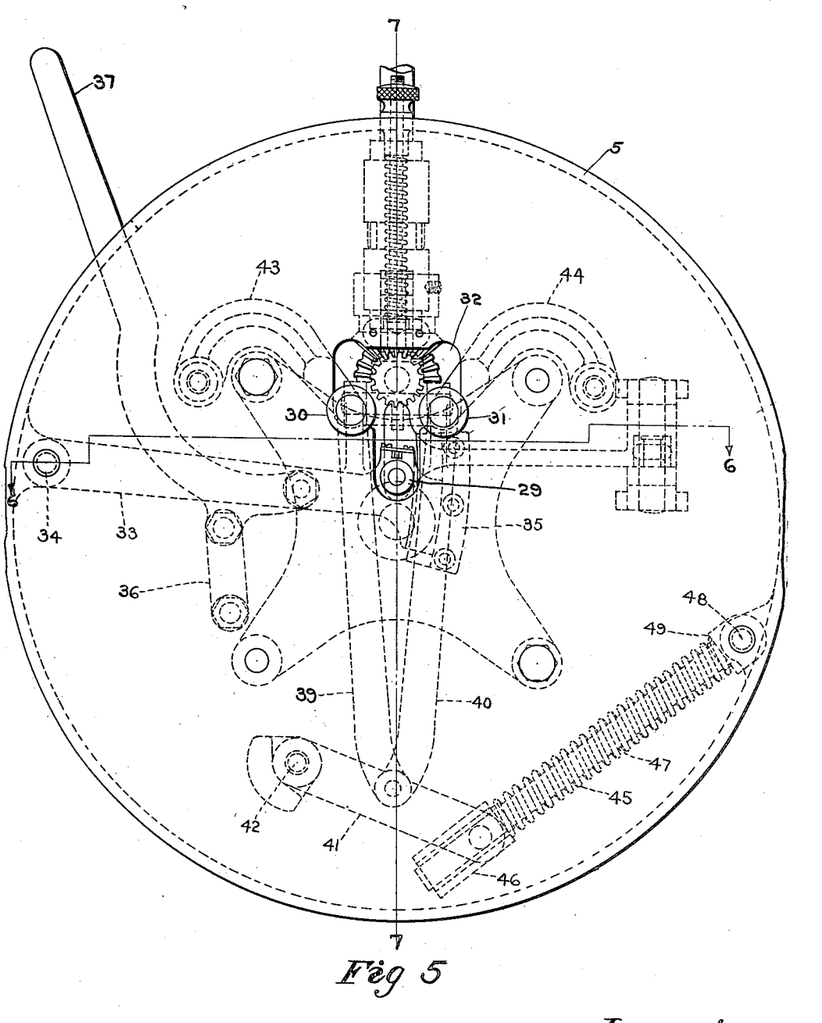
Fig. 5 is a plan of the platen or work supporting table.
Figure 14:
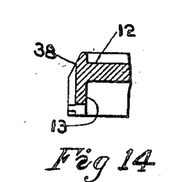
Fig. 14 is a sectional detail on the line 15—15, Fig. 13.

In order to hold the leader down upon the work table the exterior face of the guiding flange 13 is beveled as shown at 38 (Fig. 14). This beveled surface is engaged by the frusto-conical guide rolls 30 and 31. With this construction the guides 29, 30 and 31 have a three-point contact with the guiding flange and thus act to swing the work laterally during its feed to correct the relative position of the operating means and the insole and thereby maintain the edge of the insole adjacent the operating point in the line of feed. To enable the rolls 30 and 31 to engage the flange at all times without binding as they traverse the reverse curves of the flange at the shank and around the toe the guide rolls 30 and 31 are journaled on the free ends of links 39 and 40, respectively, the rear ends of which are pivoted to a lever 41 pivoted at 42 to the bottom of the table 5. The links 39 and 40 are also pivoted to links 43 and 44 pivoted to the bottom of the table 5. The guide rolls 30 and 31 are thus supported for movement transversely of the feed of the leader exactly as if they were supported on a slide but without the frictional resistance incident to the use of a slide. The rolls 30 and 31 are actuated in a direction to press them against the exterior face of the guiding flange 13 by means of a spring 45 (Fig. 5). At its free end the lever 41 is pivoted to a block 46 which loosely receives a rod 47 pivoted at 48 beneath the table 5. The spring 45 is coiled around the rod 47 and is interposed between the block 46 and a shoulder 49 on the rod.

With this construction the spring 45 normally holds the guide rolls 30 and 31 in the inoperative position shown in Fig. 5. When the guiding flange 13 on the leader is interposed between the inside and outside guides and the handle 37 is actuated in a direction to lock the inside guide 29 against the flange, the outside rolls are pushed forward thus placing the spring 45 under compression. The spring 45 yields during the feed of the leader so that it exerts its maximum and minimum pressures when the rolls 30 and 31 are being transferred around the shank and toe of the leader, respectively. The lever 41, however, inversely transmits the pressure of the spring so that the rolls 30 and 31 are held with a greater pressure against the toe of the leader than they are held against the shank of the leader.

Figure 2:
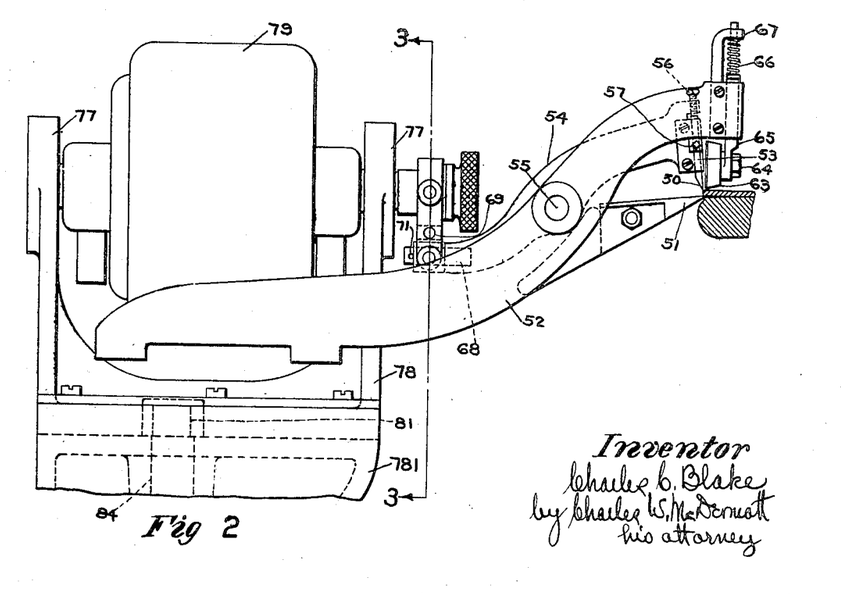
Fig. 2 is a detail in front elevation of the tools for rounding the insole.

The tool for trimming the roughly died-out insole to the edge of the last bottom consists of a knife 50 (Figs. 1 and 2) which cooperates with an anvil or foot 51 mounted on a cradle 52. The knife 50 is formed on a block 53 which is mounted on one end of a lever 54 pivoted on a stud 55 carried by the cradle 52. The knife block 53 may be adjusted in the lever 54 by a bolt 56 and then held in adjusted position by a set-screw 57.

The anvil 51 which extends between the insole and the last bottom controls the height of the work. To this end a coiled spring 58 (Fig. 1) is connected at one end to the column 11 and at its other end to a treadle 59 pivoted on the machine base. Intermediate its ends the treadle 59 is connected to the post 6 by a link 60. Depression of the treadle 59 lowers the work table 5 to permit the insertion and removal of the work. When the treadle is released and the anvil 51 positioned between the insole and the last bottom the work automatically rises and falls under the influence of the anvil 51 and the spring 58 to maintain the insole at the operating point in the same plane notwithstanding the various slopes on the last bottom. The post 6 is guided in its vertical movement by a plurality of rolls 61, on the post, which work in slots 62 formed in the bearings 7.

Figure 4:
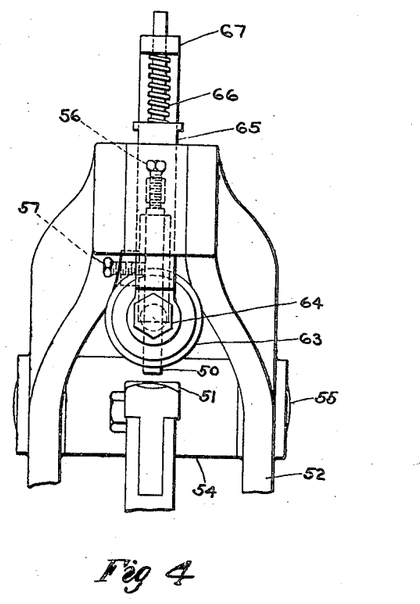
Fig. 4 is a detail in right side elevation of the insole rounding tools.

The insole at the operating point is held down upon the anvil 51 by a pressure roll or foot 63 (Figs. 2 and 4) which is journaled on a stud 64. The stud 64 is carried by the lower end of a slide 65 mounted to slide in the cradle 52. The roll 63 is pressed toward the insole by a spring 66 coiled around a rod on the slide 65 and interposed between the arm 67 on the cradle 52 and the top of the slide.

Figure 3:
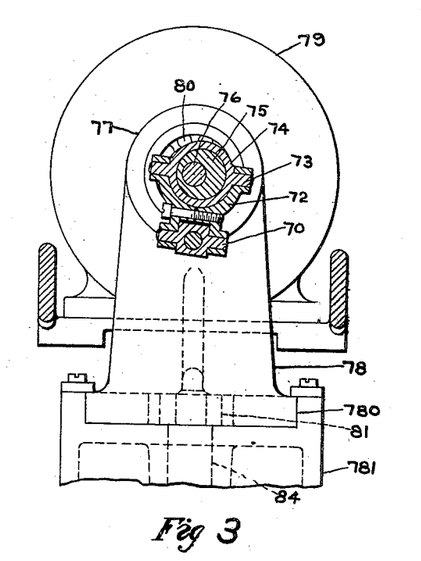
Fig. 3 is a right side sectional elevation on the line 3—3, Fig. 2.

In order to vibrate the knife 50 the lever 54 is provided with a cylindrical pin 68 upon which a block 69, provided with trunnions 70 (Figs. 2 and 3) is loosely held by a cotter pin 71. The trunnions 70 support a split yoke 72 (Fig. 3) which is hung on trunnions 73 formed on an eccentric strap 74 which embraces an eccentric 75. The eccentric 75 is secured to a shaft 76 which is supported by bearings 77 formed in a head 78 mounted to slide in ways 780 (Fig. 9) formed in a bracket 781 bolted to the column 11. The shaft 76 is the armature shaft of an electric motor 79 secured to the cradle 52 and rotates on an axis passing through the point of operation of the knife.

During the transfer of the point of operation of the knife 50 around the insole it is desirable that the cradle 52 tip automatically to maintain the knife 50 substantially normal to the insole at the point of operation. To this end a series of balls 80 (Fig. 3) are interposed between a ball race, one member of which is secured to the bearing 77 and the other member of which is secured to the shaft 76. With this construction the cradle 52 floats on an axis passing through the point of operation of the knife 50 and is tipped automatically during the rounding operation by the combined action of the feet 51 and 63 which adapt themselves to the varying slopes on the last bottom. The knife is thus maintained normal to the insole at the operating point.

If a belt pulley or gear wheel were mounted on the shaft 76 and driven from some external source of power through a belt or gear train the cradle would become unbalanced and the feet 51 and 63 would be held in a fixed position unresponsive to the varying slopes on the last bottom. By directly applying the power to the shaft 76 through the armature of an electric motor the balance of the cradle is preserved and its sensitive response to the positions assumed by the feet under the influence of the work is insured.

The knife 50 vibrates in a plane intersecting the edge of the last bottom at the sides thereof. In order to maintain the plane of the knife intersecting the edge of the last bottom during its transfer around the toe of the insole notwithstanding the toe-box variation hereinbefore referred to, the head 78 is moved on the bracket 781 to shift the knife supported from the head transversely of the feed. The knife is shifted twice during the rounding operation first to remove the tool from the path determined by the leader and then to return the tool to said path. The knife is thus caused to traverse a detour at the toe of the insole coterminous with the path determined by the leader.

The head 78 is shifted by an eccentric 81 (Fig. 9) arranged to work in a housing 82 on the head 78. The eccentric 81 is secured to the upper end of a vertical shaft 84 the upper end of which is journaled in the bracket 781 and the lower end of which is journaled in a sleeve 85 mounted to rotate in a bearing 86. The shaft 84, normally inoperative, is driven at the proper intervals through a clutch, one member of which consists of a disk 87 on the shaft, and the other member of which consists of a clutch body 88 surrounding the disk 87 and carried by the sleeve 85. A cylinder-carrying disk 89 is loosely mounted on a collar 90 carried by the shaft 84, and this disk is provided with a laterally-extending flange which lies between the inner surface of the clutch member 88 and the disk 87. The disk 89 is provided with a series of recesses in which the clutch cylinders 91 are carried. The disk 87 is provided with a series of wedging surfaces 92 (Fig. 8) for coöperating with the cylinders in connecting and disconnecting the clutch members. The cylinder-carrying disk 89 and collar 90 are connected by a spring 93 which tends to rotate the ball-carrying disk in a direction to cause the cylinders to wedge between the surfaces 92 and the inner surface of the clutch member 88 and bind the clutch members together. When the clutch members are engaged in the manner described the shaft 84 is driven through a bevel gear 94, on the sleeve 85, which is engaged by a bevel gear 95 on the shaft 22.

The clutch is normally held out of action by means of a controlling stop in the form of a slide 96 one end of which normally projects into position to be engaged by a radially projecting lug 97 on the cylinder-carrying disk 89 and prevent rotation of the disk. When the slide 96 is withdrawn, the spring 93 acts to immediately move the clutch cylinders 91 into position where they are wedged between the surfaces 92 and inner surface of the clutch body 88, and securely unite the parts of the clutch so that motion is imparted to the shaft 84 through the sleeve 85 and connected gearing until a second lug 98 on the cylinder-carrying disk is engaged by the slide 96 when the shaft 84 has made one-half a revolution.

The withdrawal of the slide 96 and the engagement of the clutch which drives the shifting mechanism for the head 8 is effected twice during the operation of the rounding knife 50 around the insole by the action of controlling devices on the leader, and the slide 96 is automatically returned into position to disengage the clutch when the clutch has made one-half a revolution. The slide 96 is pivoted to the upper end of an arm 99 projecting from a rock shaft 100 (Fig. 1) journaled in bearings 101 on the column 11. The slide 96 is actuated in a direction to withdraw it from the lug 97 by a spring 102 (Fig. 1) coiled around the rock shaft 100 and connected at its opposite ends to one of the bearings 101 and to a collar 103 on the rock shaft.

Figure 6:
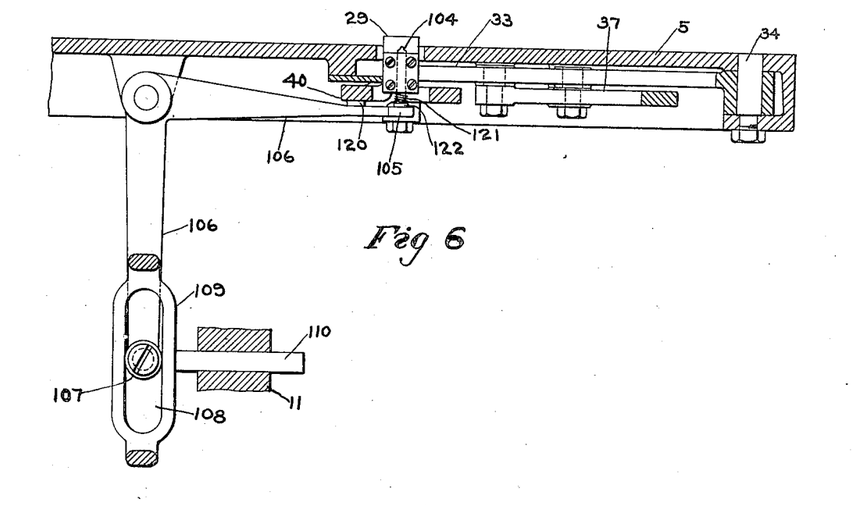
Fig. 6 is a right side sectional elevation on the line 6—6, Fig. 5.

The slide 96 is held in lug-engaging position against the tension of the spring 102 by a finger 104 (Figs. 6 and 7) arranged in the path of travel of the bottom of the guiding flange on the leader. To this end the finger 104 is loosely mounted on the lever 33, hereinbefore described as the support for the inside guide pin 29, in position to rest on the elongated end 105 of a bell crank lever 106 (Fig. 6) pivoted beneath the table 5. The lower end of the vertical arm of the bell crank lever 106 is provided with a roll 107 which rides in a vertical slot 108 formed in a yoke 109 carried by a bar 110 mounted to slide loosely in the column 11. The yoke 109 is also pivoted to an arm 111 (Fig. 1) depending from the rock shaft 100.

During the operation of the knife 50 on the sides of the insole the finger 104 is pressed downwardly by engagement with the bottom of the guiding flange 13, and thus maintains the slide 96 engaged with the lug 97 against the tension of the spring 102. When the knife 50 reaches the point A (Fig. 11) the finger 104 rides into a depression 112 (Fig. 13) under the influence of the spring 102 thus freeing the lug 97 and causing the shaft 84 to be driven through the clutch members. The finger 104 is reset by an incline 113 (Fig. 13) on the leader so that the slide 96 is returned to a position where it may engage the lug 98 and throw the shaft 84 out of operation when it has completed one-half a revolution. The knife 50 maintains the position to which it has been shifted until the finger 104 rides into a second depression 114, on the other side of the leader, and the knife 50 is then shifted back to its original position which brings the knife 50 back to the path determined by the leader at the point B. The finger 104 is again reset by the incline 115.

In order to hold the head 78 accurately in its "out" and "in" positions the collar 90 (Fig. 9) is provided with a pair of pins 116 and 117 (Fig. 8) which are engaged successively by a spring-pressed dog 118 pivoted on a lug on the bracket 78¹. The dog 118 yields to permit the passage of the pins during the rotation of the shaft 84 and then slips behind one of the pins where the clutch members are disengaged. The shaft 84 is held by the dog 118 and slide 96 in a definite angular position thus accurately defining the limits for the shifting movements of the head 78.

To insure a positive engagement between the slide 96 and the lug 97 or 98 the shaft 84 is provided with a fly-wheel 119 which provides the cylinder-carrying disk 89 with sufficient momentum to properly engage the lugs 97 and 98 with the slide 96.

In order to prevent the tripping of the finger 104 when the leader is withdrawn from the machine the link 40 (Fig. 6) is provided with a cam 120 which, as the link 40 moves back to its original position when the guide pin 29 is unlocked from the leader, engages the bell crank lever 106 and prevents it from moving in a direction to release the slide 96 from the lug 97. A spring 121 coiled around the finger 104, and interposed between the lever 33 and a head 122 on the finger 104 insures the depression of the finger 104 below the surface of the platen when no leader is in the machine. The spring 121 also insures the engagement of the head 122 with the elongated end 105 of the bell crank lever 106 during the making and breaking of the toggle to engage and disengage the guide pin 29 and the leader.

In the machines heretofore used in my system of shoe manufacture it has been necessary for the operative to carefully position the leader against the driving pinion to insure the rolling contact of the teeth on the pitch line. In order to permit the operative to engage the pinion and leader without special care or attention the pinion 14 is yieldingly mounted so that in the event that the operative positions the faces of the teeth and pinion in contact the pinion will automatically find its rolling contact position on the pitch line of the leader. To this end the shaft 16 (Fig. 7) is journaled in a sleeve 123 which is pivoted on a bracket on the post 6. The sleeve is held against a stop 123ª on the post by a plunger 124 loosely carried by the table 5. Coiled around the plunger 124 is a spring 125 which is interposed between the table 5 and a collar 126 on the plunger. The plunger is screw-threaded at one end to receive a nut 127 for limiting the position of the plunger. With this construction the spring 125 will yield when the operative positions the face of a tooth on the leader against a face of a tooth on the pinion. Then when the pinion is rotated to drive the leader the spring 125 presses the pinion into proper driving engagement with the leader. The spring 125 also permits the pinion to automatically adapt itself to any irregularities in the teeth on the leader during the drive thereof.

The shaft 26 (Fig. 10) is driven through a friction clutch from an electric motor 128 secured to the base of the machine. The armature shaft 129 carries a friction disk 130

Figure 10:
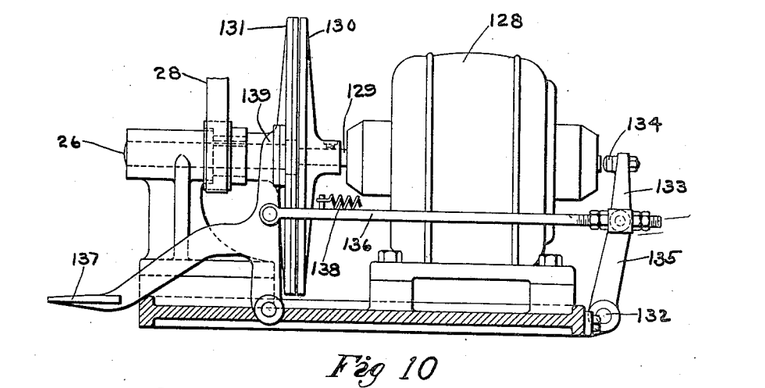
Fig. 10 is a detail in right side elevation of the starting and stopping mechanism for driving the leader and the shifting mechanism.

130 mounted adjacent a friction disk 131 on the shaft 26. As well known to those skilled in the art it is possible to provide a magnetic center for the armature shaft 129. That is, while the shaft 129 is free to move longitudinally under pressure applied to one end of the shaft it must always return to a definite central position upon the release of the shaft from endwise pressure. Accordingly, advantage is taken of this magnetic center to provide a novel starting and stopping mechanism for the machine. To this end the base of the machine is provided with a rock shaft 132 having a vertical arm 133 projecting therefrom. The upper end of the arm 133 carries a block 134 arranged opposite the rear end of the shaft 129. To rock the shaft 132 and thus engage the block 134 with the shaft 129 the rock shaft 132 carries a second vertical arm 135 which is connected by a rod 136 with a foot treadle 137 pivoted on the base of the machine. When the foot treadle 137 is depressed the shaft 129 is moved longitudinally thus engaging the disk 130 with the disk 131. When the treadle is released the shaft 129 immediately returns to its magnetic center thus withdrawing the disk 130 from the disk 131. At the same time a spring 138 connected at one end to the rod 136 and at its other end to the column 11 forcibly applies a brake 139 on the treadle lever to the disk 131.

In operating the machine the treadle 59 is depressed to lower the table 5. The leader carrying the last having the roughly died-out insole attached thereto is then placed on the table with the guiding flange on the leader interposed between the inside and outside guides. The handle 37 (Fig. 5) is then actuated to lock the inside guide against the guiding flange thus clamping the leader between the guides under the influence of the spring 45. This movement of the handle 37 releases the bell crank lever 106 from the cam 120 (Fig. 6) thus causing the spring 102 (Fig. 1) to press the finger 104 against the bottom of the guiding flange on the leader. The insole is now positioned in the machine with the insole adjacent the operating point gripped between the rolls 63 and anvil 51 which is inserted between the bottom of the last and the insole at approximately one breast corner. The knife 50 having been thrown into operation and the treadle 137 having been depressed to actuate the pinion 14 the insole is trimmed to the edge of the last bottom until the point A (Fig. 11) is reached. At this point the finger 104 rides into the depression 112 thereby freeing the lug 97 and throwing the shifting mechanism into operation to shift the knife 50 and thus cause it to start on its detour (Fig. 11). The finger 104 is immediately reset by the incline 113 so that the slide 96 may engage the lug 98 upon the completion of a half revolution of the clutch and throw the shifting mechanism out of operation. The knife 50 continues to cut the insole on a line parallel to the path determined by the toe of the leader until the point B is reached when the finger 104 rides into the depression 114 (Fig. 13) and the shifting mechanism is thrown into operation a second time to return the knife 50 to the path determined by the leader. The finger 104 is again reset to hold the shifting mechanism inoperative in its original position. During the transfer of the point of operation of the cutter around the insole the cutter 50 tips automatically about its point of operation to maintain it substantially normal to the insole at the point of operation and the insole rises and falls under the influence of the spring 58 and anvil 51 to maintain the bottom of the last adjacent the operating point substantially in the plane of the anvil. At the completion of the cut the treadle 137 is released to stop the drive for the pinion 14 and the treadle 59 is depressed to permit the finished work to be withdrawn from the machine.

While the invention has been illustrated and described in connection with a sole rounding machine it will be apparent to those skilled in the art that the features of the invention may be advantageously employed in performing other operations in the manufacture of shoes and parts thereof and particularly in the manufacture of lasts for determining the shape of the last bottoms.

It will also be clear to those skilled in this class of machines and with the general objects of the present invention in view, that changes may be made in the details of structure, the described and illustrated embodiment thereof being intended as an exploitation of its underlying essentials the features whereof are definitely stated in their true scope in the claims herewith.

What is claimed as new, is:—

1. A machine of the class described, having, in combination, an operating tool, a work support, feeding means, means for correcting the relative position of the tool and the support including a leader for determining the relative path of travel of the tool, mechanism for shifting the tool to cause it to traverse a detour coterminous with said path, a driving mechanism for the shifting mechanism, and controlling mechanism acting to throw the driving mechanism into operation, substantially as described.

2. A machine of the class described, having, in combination, an operating tool, a work support, feeding means, means for correcting the relative position of the tool and the support during the feed including a leader for determining the relative path of travel of the tool, mechanism for shifting the tool to cause it to traverse a detour coterminous with said path, a driving mechanism for the shifting mechanism, and controlling mechanism acting to throw the driving mechanism into and out of operation twice during the traverse of the tool, substantially as described.

3. A machine of the class described, having, in combination, an operating tool, a work support, feeding means, means for correcting the relative position of the tool and the support during the feed including a leader for determining the relative path of travel of the tool, mechanism for shifting the tool to cause it to traverse a detour coterminous with said path, a driving mechanism for the shifting mechanism, tripping devices on the leader for throwing the driving mechanism into operation, and connections between the leader and the driving mechanism, substantially as described.

4. A machine of the class described, having, in combination, an operating tool, a work support, feeding means, means for correcting the relative position of the tool and the support during the feed including a leader for determining the relative path of travel of the tool, mechanism for shifting the tool to cause it to traverse a detour coterminous with said path, a driving mechanism for the shifting mechanism, tripping mechanism acting to throw the driving mechanism into operation, and means acting to reset the tripping mechanism and throw the driving mechanism out of operation, substantially as described.

5. A machine of the class described, having, in combination, an operating tool, a work support, feeding means, means for correcting the relative position of the tool and the support during the feed including a leader for determining the relative path of travel of the tool, mechanism for shifting the tool to cause it to traverse a detour coterminous with said path, a driving mechanism for the shifting mechanism, a driving clutch therefor, tripping mechanism for controlling the engagement of the clutch, and mechanism operated through the leader for resetting the tripping mechanism and disengaging the clutch, substantially as described.

6. A machine of the class described, having, in combination, an operating tool, a work support, feeding means, means for correcting the relative position of the tool and the support during the feed including a leader for determining the relative path of travel of the tool, mechanism for shifting the tool to cause it to traverse a detour coterminous with said path, a driving mechanism for the shifting mechanism, a driving clutch therefor, a series of trips on the leader, latching devices for preventing the engagement of the clutch connected to be tripped by the leader, and means acting automatically to reset the latching devices and disengage the clutch, substantially as described.

7. A machine of the class described, having, in combination, an operating tool, a work support, feeding means, means for correcting the relative position of the operating tool and the work support during the feed including a leader for determining the relative path of travel of the tool, a sliding head for the tool, mechanism for sliding the head to cause the tool to traverse a detour coterminous with said path, a driving mechanism for the sliding mechanism and controlling mechanism acting to throw the driving mechanism into operation, substantially as described.

CHARLES C. BLAKE.